April 7, 1970  C. FREDERICK, JR  3,504,456
ADJUSTABLE WEATHER SEALING RAIL FOR DOORS
Filed Jan. 16, 1969  2 Sheets-Sheet 1
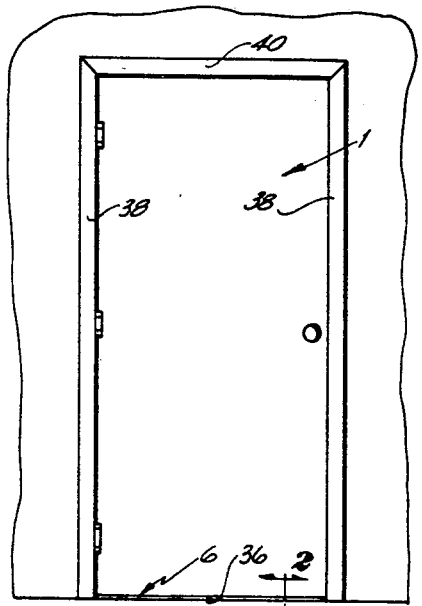
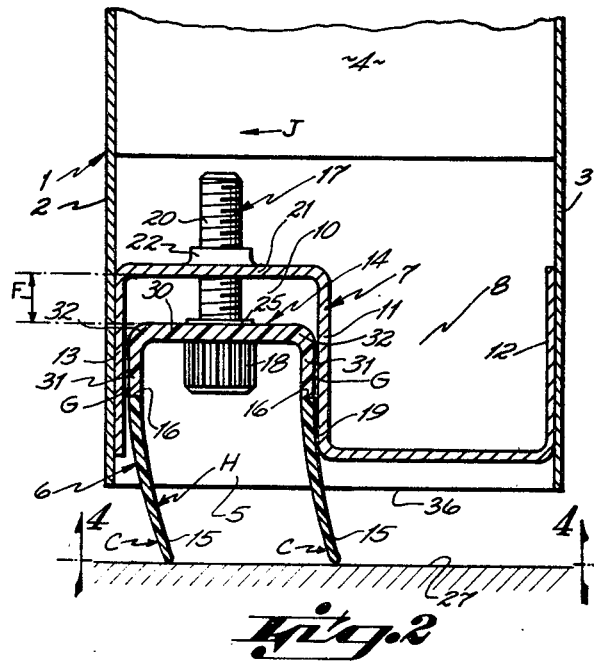
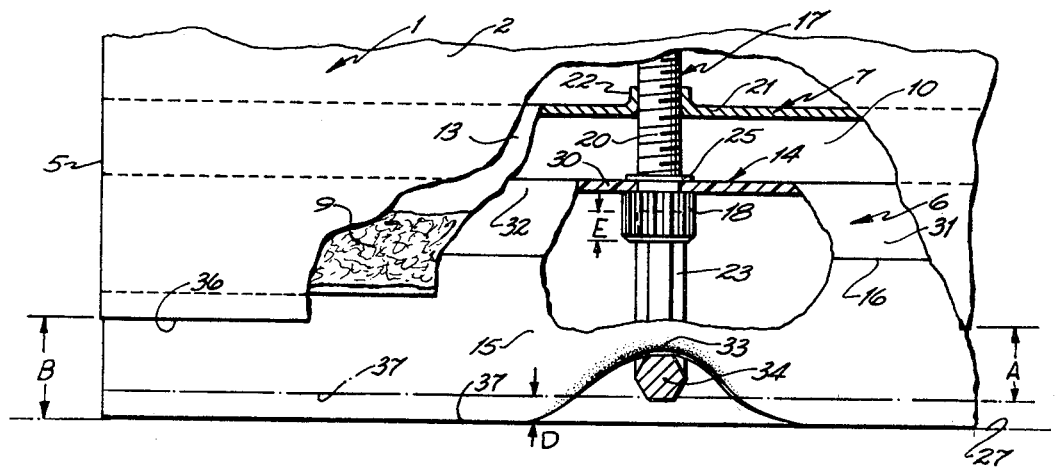
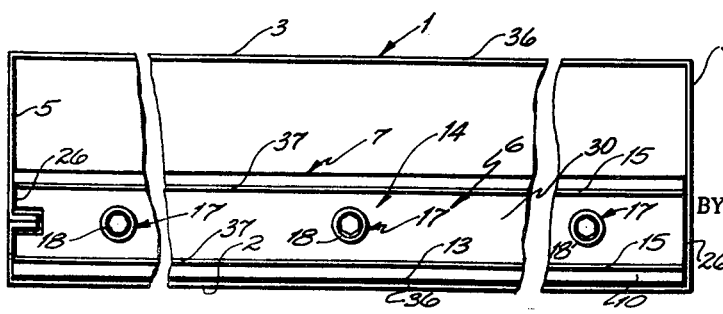
INVENTOR.
Claud Frederick Jr.
BY Ayel, Henry L. Evans
ATTORNEYS

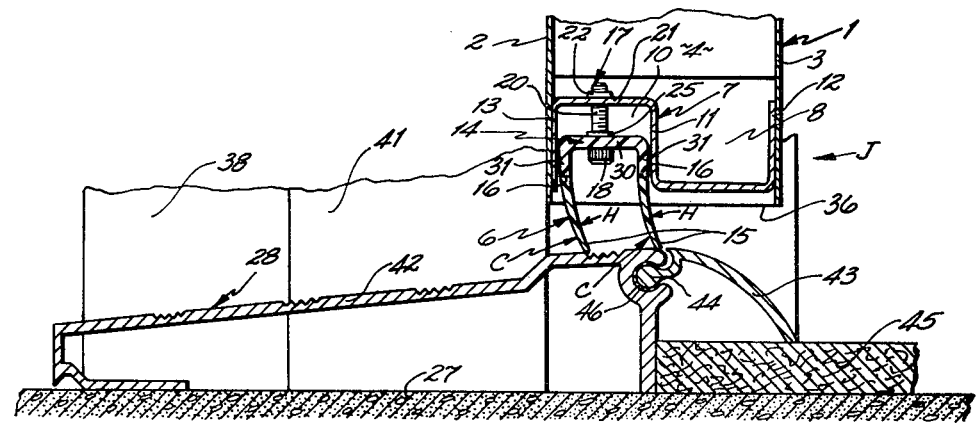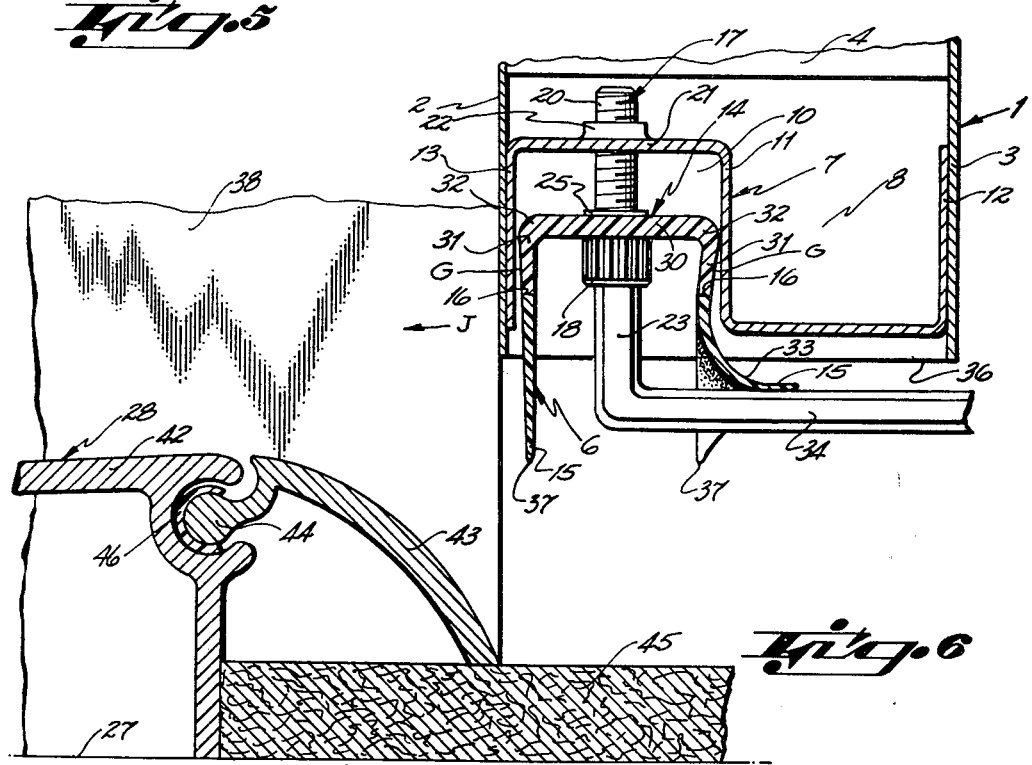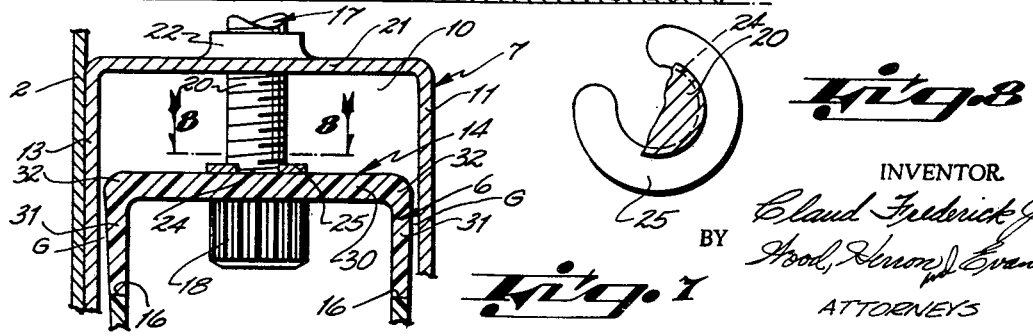

United States Patent Office 3,504,456
Patented Apr. 7, 1970

3,504,456
ADJUSTABLE WEATHER SEALING RAIL FOR DOORS
Claud Frederick, Jr., Cincinnati, Ohio, assignor to The Steelcraft Manufacturing Co., Cincinnati, Ohio, a corporation of Ohio
Filed Jan. 16, 1969, Ser. No. 791,721
Int. Cl. E06b *1/70, 7/18*
U.S. Cl. 49—470　　　　　　　　　　　　7 Claims

ABSTRACT OF THE DISCLOSURE

A weather sealing rail, particularly for the lower edge of a door, in which the door includes a downwardly facing receiving channel formed of sheet metal, with the weather sealing adjustment rail, also of downwardly facing channel configuration interfitted within the receiving rail. The adjustable weather sealing rail is of composite design, formed of a non-metallic material such as a plastic. The upper portion of the adjustment rail is in the form of a stiff channel section formed of a rigid material, such as vinyl. Joined to the lower edges of the rigid channel section is a pair of flexible limbs, also of a plastic material, such as a flexible vinyl. The adjustment rail is held in position within the sheet metal receiving rail by a series of captive adjustment screws. The yieldability of the flexible limbs permits the insertion of an adjusting instrument adjacent the floor into engagement with the adjusting screws to bring the lower edges of the flexible limbs into wiping engagement with the floor surface. The flexible weather sealing limbs yield sufficiently to permit withdrawal of the instrument after the flexible limbs have been adjusted into wiping engagement with the floor surface.

BACKGROUND OF THE INVENTION

The invention relates, in general, to an adjustable rail which provides a weather seal with respect to an edge portion of the door, particularly the lower edge, so as to provide a seal with reference to the floor or threshold of the building.

The present sealing rail structure is particularly intended for installation in doors which are fabricated of sheet metal, comprising spaced body panels, with a filler or core interposed between the panels. The door further includes closure flanges extending about its side and top edges and is mounted within a door casing or frame, also formed of sheet metal. The door and its frame are prefabricated and are intended to be installed within the door opening in the field in a rapid convenient manner.

One of the primary objectives of the invention has been to provide an adjustable weather sealing rail or strip, particularly for the lower edge portion of the door, in which the rail may be adjusted in a convenient manner with respect to the plane of the floor or plane of a raised threshold after the door has been hung within its frame.

According to this concept, the lower edge portion of the door is provided with a receiving rail of rigid design, preferably formed of sheet metal and having a downwardly facing receiving channel. The adjustable weather sealing strip is also channel-shaped in cross-section and is telescopically interfitted with the downwardly facing channel section of the receiving rail to be adjusted with respect to the floor by a series of captive adjustment screws having shank portions which extend upwardly and pass in threaded engagement through the cross web of the sheet metal receiving rail. The adjustable weather sealing rail is adjusted vertically with reference to the receiving rail by means of a suitable tool inserted into the heads of the adjustment screws.

Another objective of the invention has been to provide a weather sealing rail which may be adjusted downwardly to engagement with the floor surface after the door is hung in its frame, such that the lower edges of the weather sealing strip may provide a wiping engagement with the surface of the floor and at the same time, permit the insertion and retrieval of a tool between the surface of the floor and lower edge portion of the flexible weather seal in making the adjustment.

In order to carry out this concept, the upper portion of the adjustment rail is in the form of a stiff channel section, with a pair of flexible limbs, joined to the stiff channel section. The adjustment rail is held in position within the sheet metal receiving rail by the captive adjustment screws. The flexible limbs thus permit the insertion of an adjusting tool, such as an Allen wrench adjacent the floor into engagement with the adjusting screws to bring the lower edges of the flexible limbs into wiping engagement with the floor surface and permit withdrawal of the tool after the flexible limbs have been adjusted into wiping engagement with the floor surface.

A further objective has been to provide an arrangement of captive adjustment screws for the weather sealing rail, whereby the rail is forced upwardly or downwardly in a positive manner in accordance with the direction of screw adjustment.

According to this aspect of the invention, the adjustment screws each include a head seated against the lower surface of the weather sealing rail, with a shank portion extending upwardly through the cross web of the downwardly facing channel portion of the receiving rail. In order to hold the screws against longitudinal motion, the shank portion of each screw above the head is provided with a groove, with a split snap washer engaged within the groove and seated against the upper surface of the weather sealing rail. The screw is thus held captive with reference to the cross web of the weather sealing strip.

The several objectives and advantages of the invention will be more fully apparent from the following detailed description taken in conjunction with the drawings.

DESCRIPTION OF THE DRAWINGS

FIGURE 1 is an elevational view illustrating typical sheet metal door mounted within a door casing or frame and equipped with the weather sealing edge adjustment rail of this invention.

FIGURE 2 is a fragmentary sectional view taken along the line 2—2 of FIGURE 1, detailing the lower edge portion of the door and the weather sealing adjustment rail with reference to a floor surface.

FIGURE 3 is an enlarged fragmentary sectional view, showing the lower edge portion of the door, including the adjustment rail, with the adjustment wrench in position for setting the rail.

FIGURE 4 is a bottom view of the door, as viewed along the line 4—4 of FIGURE 2, further detailing the weather sealing adjustment rail and its captive adjustment screws in relation to the bottom portion of the door.

FIGURE 5 is a view similar to FIGURE 2, showing the adjustment rail structure in relation to a sectional threshold which provides a thermal seal, as distinguished from the floor surface illustrated in FIGURE 2.

FIGURE 6 is an enlarged fragmentary sectional view taken from FIGURE 5, showing the door swung inwardly towards its open position and showing the adjustment wrench engaging one of the adjusting screws for setting the adjustment rail with reference to the sectional thermal threshold of FIGURE 5.

FIGURE 7 is an enlarged fragmentary sectional view, detailing one of the captive screws of the adjustment rail, together with its snap-type retaining ring.

FIGURE 8 is a sectional view taken along the lines 8—8 of FIGURE 7, further detailing the retaining ring which engages the shank portion of the adjustment screw to lock the screw longitudinally with reference to the adjustment rail.

DOOR CONSTRUCTION

The door, indicated generally at 1, which has been selected to illustrate the principles of the adjustable door bottom rail of this invention, is illustrated, at least in part, in FIGURES 1–3. As shown in these views, the door 1 is fabricated from sheet metal and comprises a pair of spaced body panels 2 and 3 with a core or filler 4 (FIGURE 2) interposed between the panels 2 and 3 to provide a stiffening and sound deadening effect. The core 4 is formed of a stiff fibrous sheet material, preferably of a honeycomb formation and is light in weight.

It will be noted that the sheet metal door 1 is of composite design, including closure flanges 5—5 (FIGURE 4) extending along the opposite edge portions of the panels 2 and 3 and providing a marginal closure for the door. A similar closure flange (not shown) extends across the top portion of the door. Since the construction of the closure flanges are not pertinent to the invention, the structural details have been omitted from the disclosure.

The adjustable weather sealing bottom rail of this invention is indicated generally at 6 and is described in detail later. In general, the adjustable bottom rail 6 is of inverted U-shape configuration in cross section and is formed of a plastic material, as described later in detail. It is to be understood at this point, that the adjustable door bottom rail 6 is shiftably mounted within a rigid receiving rail, indicated generally at 7, extending across the lower portion of the door to complete the closure which is provided by the side and top closure flanges 5, indicated earlier. It will be understood that the weather sealing bottom rail 6 and its receiving rail 7 may be incorporated in a door of wood construction instead of the sheet metal door which is disclosed.

The weather sealing rail 6 of the invention is disclosed in relation to the plane of a floor surface of a building and also in relation to the surface of a thermal threshold which inhibits the flow of heat between the inside portion of the building toward the outside. The threshold includes a fixed body and a hinged leaf, a heat insulating bushing being interposed between the two parts so as to inhibit the flow of heat between the parts. The thermal threshold is described and claimed in the co-pending application Ser. No. 791,924, which was filed on Jan. 17, 1969.

The receiving rail 7, which is formed of sheet metal, is of an inverted S-shape in cross section, comprising an upwardly facing channel 8 and a downwardly facing channel 10, with an intermediate connecting section 11 joining the two channels 8 and 10. The upwardly facing channel 8 includes an upstanding flange 12 (FIGURE 6) at its outer edge portion, which completes the channel. The downwardly facing channel 10, at its outer edge portion, includes a downwardly extending flange 13, spaced from the intermediate connecting flange 11, thus completing the rigid receiving rail.

In the present example, the receiving rail 7 has a width equal to the spacing of the body panels 2 and 3, as defined by the filler 4 and by the closure flanges 5—5. The flanges 12 and 13 of the receiving rail are secured to the lower marginal portion of the body panels 2 and 3. In the present example, the flanges 12 and 13 of receiving rail 7 are secured to the lower edge portion of the panels 2 and 3 with an adhesive, such as an epoxy 9 (FIGURE 3). This method of attachment is preferred since it is more convenient than the conventional spot welding operation.

ADJUSTABLE WEATHER SEAL RAIL

The weather seal adjustment rail, previously indicated at 6 is, as noted, of inverted U-shaped configuration in cross section and is telescopically interfitted in the downwardly facing channel 10. The adjustable rail 6 is of composite design, fabricated from a plastic material. In the form shown, the U-shaped adjustment rail 6, comprises a channel section 14 formed of a rigid material, with a pair of flexible limbs 15–15 which are integral with the channel section and joined thereto along the lines 16–16 (FIGURE 6).

The adjustable rail 6 is slidably mounted within the receiving channel 10 by means of a series of captive adjustment screws 17 (FIGURES 6 and 7). Each adjustment screw has a head portion 18 seated against the lower surface of the rigid channel web section 14, with a shank portion 20 in screw threaded engagement with the cross web 21 of the downwardly facing channel 10. As best shown in FIGURE 7, the cross web 21 of the downwardly facing receiving channel 10, through which the shanks 20 of the captive adjustment screws 17 are threaded, is provided with a series of upwardly extruded holes which provide collars 22. The collars are threaded and provide an extended screw threaded engagement with the threaded shanks 20 of the adjustment screws 17.

In the present example, the head 18 of each of the captive adjustment screws 17 is of the socket or Allen head type for the reception of a commercial Allen wrench 23 (FIGURE 3). In order to provide for precise adjustment of the rail 6 with reference to the floor level or threshold, each adjustment screw 17 includes, adjacent the head portion, a split snap ring 25, which is of a commercial design, engaged within the thread of the screw shank 20, as indicated at 24, or in a groove (not shown) formed in the shank. The ring 25 seats upon the top surface of the rigid channel section 14 of the adjustment rail 6, thus holding or capturing the screw against longitudinal motion. Accordingly, by rotating the adjustment screws with the Allen wrench 23 (FIGURES 3 and 6), the adjustment rail may be raised or lowered in a positive manner with reference to the floor level or with reference to the level of a threshold, as described later. The snap ring 25 thus holds the weather seal rail 6 downwardly in positive engagement with the surface of the floor or threshold.

As viewed from below (FIGURE 4) receiving rail 7 extends for the full width of the door and joins the opposed closure flanges, previously indicated at 5–5. The adjustable weather seal rail 6 is co-extensive with the receiving rail 7, a slight clearance, indicated at 26–26 being provided between the opposite ends of the adjustable rail 6 and the closure flanges 5 (FIGURE 4).

It will be understood that the adjustment rail 6 may be installed both along the upepr edge and the lower edge of the door to provide a weather seal. However, in the present example, it is illustrated only in its utility as installed in the lower edge portion of the door.

Also to be noted is the fact that the adjustment rail 6 may be installed in relation to the floor 27 of the building (FIGURE 2) or it may be installed in buildings which include a raised threshold, for example, the threshold 28 illustrated in FIGURE 6. In either case, the adjustment rail 6 is arranged to be set or adjusted with reference to the floor level or plane of the threshold after the door has been installed within its frame in the field for accuracy and convenience in making the adjustment. The rail may be readjusted in the same manner after it has been in use, so as to provide the weather sealing action.

In adjusting the rail 6 with reference to a floor having no threshold (FIGURE 3), a conventional Allen wrench, previously indicated at 23 is inserted into the socketed head 18 of the several adjustment screws 17 so as to rotate the screws in the proper direction to raise or lower the sealing rail 6. In the present example, the adjustment rail 6 is provided with a set of three adjustment screws 17, although this number may be varied in accordance with the width of the door. It will also be understood at this point, that the rigid channel section 14 has sufficient stiffness to support the cross rail in its adjusted position without sagging between the adjustment screws 17.

As best shown in FIGURES 6 and 7, in order to provide the required stiffness, the rigid channel section 14 comprises a cross web 30 with opposed limbs 31–31 joined by curved sections 32–32 to the cross web. As noted earlier, the channel section 14 is formed of a rigid plastic material such as rigid vinyl.

It is to be noted at this point, that the flexible limbs 15–15, which are joined to the rigid limbs 31–31, have the advantage of providing a wiping, weather sealing action with reference to the floor surface or with reference to the surface of the threshold 28. The flexible limbs 15 have the second advantage of permitting the rail 6 to be adjusted with reference to the floor, since the flexible limb 15 deforms upwardly, as at 33 (FIGURE 3), in the area of the wrench handle 34. This permits the adjustment rail 6 to be brought downwardly into contact with the floor 27 without interfering with the operation and/or removal of the wrench 23 after the adjustment has been completed.

As shown in FIGURE 3, as a typical adjustment, the rail 6 initially (at installation of the door) may be adjusted to the elevated position indicated at A with reference to the lower edge 36 of the door. As shown at B, in FIGURE 3, the lower edges 37 of the flexible limbs 15 are brought to the floor level 27 to provide the wiping, weather sealing action, as indicated by the arrow C, (FIGURE 2).

It will be noted in FIGURE 3 that the upwardly flexed portion 33, which accommodates the handle 34 of the wrench, permits the wrench to be lowered as at D, toward the floor level 27 to clear the socket engagement of the wrench 23 for wrench removal, as indicated at E (FIGURE 3). After the wrench is brought downwardly and removed, the upwardly flexed portion 33 of the lower edge of the flexible limb 15 springs downwardly into sliding contact with the floor 27 as indicated in FIGURE 2.

In order to permit clearance for adjustment of the door bottom rail 6, a clearance indicated at F (FIGURE 2) exists between the cross web 21 of receiving rail 7 and the cross web 30 of the weather seal rail 6. In addition, a slight clearance, indicated at G, also exists between the side flanges or limbs 11 and 13 of the receiving rail 7. After the weather sealing rail 6 is properly adjusted, its lower edges should contact the surface 27 of the floor to provide the weather seal. This contact produces a dragging action, causing the flexible limbs 15 to be bent slightly, as indicated at H (FIGURE 2) in a trailing direction in relation to the direction of the swinging motion of the door, as indicated by the arrow J. This causes the limb 15, in the trailing direction, to contact connecting section 11 (FIGURE 2) as at 19 to complete the weather seal.

It will be understood that door 1 is hinged within a conventional door frame comprising (FIGURE 1) the usual pair of vertical door jambs 38, with a horizontal header 40 extending across the upper ends of the jambs. The jambs and header each include a door stop 41 (FIGURE 5) against which the door seats in its closed position, thus completing the weather seal about the marginal portion of the door in its closed position.

In the embodiment disclosed in FIGURES 5 and 6, the adjustable weather sealing strip 6 is shown in relation to the thermal threshold, indicated generally at 28, which is disclosed in detail in the aforesaid co-pending application. Described generally, the thermal threshold 28 comprises a fixed body section, indicated at 42, which seats upon the floor 27. The fixed body section 42, which is generally channel-shaped projects to the exterior of the building wall as part of the jamb sections which are exposed to the weather.

A hinged leaf 43 is hinged as at 44 to the inner edge of the fixed body section 42 and is self-adjusting with reference to the floor covering 45 which extends into the interior of the building. In order to provide a thermal barrier between the fixed body 42 and the hinged adjustment leaf 43, there is provided a bushing 46 as part of the hinged connection which acts as a heat insulating element.

When the weather sealing rail 6 is utilized in combination with the thermal threshold 28, the rail 6 is adjusted by means of the wrench 23 (FIGURE 6) to bring the lower ends of the flexible limbs 15 to a plane slightly below the plane of the hinged leaf 43, as indicated in FIGURE 6. The adjustment is such that the lower ends of the limbs 15 provide the wiping or dragging action in the trailing direction of door movement, as described earlier and indicated by the arrow J in FIGURE 5. The lower end portions of the flexible limbs 15 are thus curved, as previously indicated at H to establish a weather seal with reference to the threshold body 42 and also with reference to the hinged leaf 43, thus coacting with the thermal threshold to provide a secure weather seal.

Having described my invention I claim:

1. An adjustable weather sealing rail structure for the edge portion of a door having a fixed outwardly facing receiving rail including a cross web extending along one edge portion of the door, said weather sealing rail structure comprising:

a shiftable weather sealing rail telescopically interfitted within the fixed outwardly facing receiving rail and adapted to be adjusted relative to the receiving rail;

said weather sealing rail comprising a cross web formed of relatively non-yielding material;

at least one limb formed of a flexible material joined to the rigid cross web and projecting outwardly beyond the marginal edge portion of the door;

and a plurality of rotatable adjustment screws passing through the non-yielding cross web of the adjustable weather sealing rail;

each of said screws having a portion engaging the cross web of the weather sealing rail for tool engagement;

each of said screws having a shank portion in threaded engagement with the cross web of the receiving channel;

said adjustment screws, upon being rotated, shifting the adjustment rail with reference to the receiving rail in which it is shiftably mounted.

2. An adjustable weather sealing structure for the lower edge portion of a door arranged to establish a seal with respect to the floor of a building, said weather sealing structure comprising:

a fixed receiving rail secured in the lower edge portion of the door and having a channel section facing downwardly toward the surface of the floor;

an adjustable weather sealing rail of channel-shaped cross sectional configuration telescopically interfitted within the channel section of the receiving rail and facing downwardly;

said adjustable weather sealing rail having an upper portion in the form of a non-yielding channel section comprising a cross web and a pair of non-yielding limbs extending downwardly from the opposite edges of the cross web;

a pair of flexible limbs joined to the non-yielding limbs of the channel section of the adjustable weather sealing rail and engageable with the surface of the floor beneath the lower edge portion of the door;

and a plurality of rotatable adjustment screws connecting the adjustable weather sealing rail to the fixed receiving rail;

each of said adjustment screws having a captive portion engaged in the cross web of the adjustment rail and having a shank portion projecting upwardly through said web and in threaded engagement with the cross web of the fixed receiving rail;

said adjustment screws, upon being rotated, shifting the adjustable weather sealing rail in a positive manner with reference to the fixed receiving rail to bring the lower edges of the flexible limbs of the adjustment rail into wiping engagement with the floor surface; said flexible limbs permitting the insertion of an adjustment tool between the lower edge of one of said flexible limbs and the floor surface and permitting withdrawal of the tool after the lower edge of the flexible limb has been adjusted to engagement with the floor surface.

3. An adjustable weather sealing structure as set forth in claim 2, in which each adjustment screw includes a head portion seated against the lower surface of the non-yielding cross web of the weather sealing rail, with a threaded shank portion extending upwardly and in threaded engagement through the cross web of the downwardly facing fixed channel of the receiving rail, and in which the shank portion of the screw above the head is provided with a groove, and a retaining ring engaged in said groove and contacting the upper surface of the non-yielding cross web of the adjustable weather sealing rail, whereby the weather sealing rail is moved in a positive manner in an upward or downward direction with reference to the fixed receiving channel upon rotation of the said adjustment screws.

4. An adjustable weather sealing rail for doors as set forth in claim 2 in which there is provided a door frame having a threshold seated upon the floor, the edge portions of the flexible limbs of the weather sealing rail engaging the upper surface of the threshold, at least one of the flexible limbs, in the trailing direction of door movement, springing in the trailing direction and engaging the surface of the receiving rail to provide a wiping engagement with reference to the upper surface of the threshold to provide a weather seal.

5. An adjustable weather sealing structure for the lower edge portion of a door as set forth in claim 2, in which the door is hung within a frame having athermal threshold extending between the lower ends of the jambs and seated upon the floor surface, said threshold comprising fixed body secured to the floor of a building, a hinged leaf connected to an edge portion of the fixed body, a heat insulating bushing interposed between the hinged connection of the fixed body of the threshold and the hinged leaf to inhibit the flow of heat between the fixed body and hinged leaf, at least one of the flexible limbs of the adjustable weather sealing rail establishing a wiping contact with reference to the upper surface of the thermal threshold and thereby coacting with the thermal threshold to provide a weather seal with reference to the lower edge of the door.

6. An adjustable weather sealing structure for the lower edge portion of a door as set forth in claim 2 in which the door is hung within a frame having a thermal threshold extending between the lower ends of the jambs and seated upon the floor surface, said threshold comprising fixed body secured to the floor of a building, a hinged leaf connected to the inner edge of the fixed body, a heat insulating bushing interposed between the hinged connection of the fixed body of the threshold and the hinged leaf to inhibit the flow of heat between the fixed body and hinged leaf, the flexible limbs of the adjustable weahter sealing rail establishing a wiping contact with reference to the upper surface of the hinged leaf and the upper surface of the fixed body and thereby coacting with the thermal threshold to provide a weather seal with reference to the lower edge of the door.

7. An adjustable weather sealing structure as set forth in claim 2, in which each adjustment screw includes a head portion seated against the lower surface of the non-yielding cross web of the weather sealing rail, with a threaded shank portion extending upwardly and in threaded engagement through the cross web of the downwardly facing fixed channel of the receiving rail, and in which the shank portion of the screw above the head is provided with a fixed retaining element contacting the upper surface of the non-yielding cross web of the adjustable weather sealing rail, the head of each screw having a downwardly facing socket for tool engagement, whereby the weather sealing rail is moved in a positive manner in an upward or downward direction upon rotation of the said adjustment screws by the said tool.

References Cited

UNITED STATES PATENTS

| | | | |
|---|---|---|---|
| 1,576,506 | 3/1926 | Davis | 49—482 X |
| 2,592,861 | 4/1952 | Close | 49—469 |
| 2,880,477 | 4/1959 | Kunkel | 49—488 X |
| 3,079,652 | 3/1963 | Wahfeld | 49—469 |
| 3,374,580 | 3/1968 | Ruff | 49—489 X |
| 3,448,543 | 6/1969 | Multer | 49—489 X |

DAVID J. WILLIAMOUSKY, Primary Examiner

P. C. KANNAN, Assistant Examiner

U.S. Cl. X.R.

49—482, 489